(12) United States Patent
Rivest

(10) Patent No.: US 7,044,167 B2
(45) Date of Patent: May 16, 2006

(54) CONDUCTIVE JACKET FOR TUBING

(75) Inventor: Dean W. Rivest, Oxford, PA (US)

(73) Assignee: Omega Flex, Inc., Westfield, MA (US)

( * ) Notice: Subject to any disclaimer, the term of this patent is extended or adjusted under 35 U.S.C. 154(b) by 0 days.

(21) Appl. No.: 10/820,531

(22) Filed: Apr. 7, 2004

(65) Prior Publication Data

US 2004/0200537 A1    Oct. 14, 2004

Related U.S. Application Data

(60) Provisional application No. 60/461,085, filed on Apr. 8, 2003.

(51) Int. Cl.
*F16L 11/00* (2006.01)

(52) U.S. Cl. ............... 138/121; 138/109; 138/137; 428/36.91

(58) Field of Classification Search ............... 138/121, 138/122, 109, 137; 428/36.91
See application file for complete search history.

(56) References Cited

U.S. PATENT DOCUMENTS

| | | | | |
|---|---|---|---|---|
| 2,657,364 A | * | 10/1953 | Carr ..................... | 333/241 |
| 3,795,540 A | * | 3/1974 | Mildner ................. | 428/215 |
| 3,940,718 A | * | 2/1976 | Vilkaitis ................ | 333/241 |
| 4,147,185 A | * | 4/1979 | Hines .................... | 138/121 |
| 4,334,121 A | * | 6/1982 | Kutnyak ................ | 174/68.3 |
| 4,398,058 A | * | 8/1983 | Gerth et al. ........... | 174/106 D |
| 5,284,184 A | * | 2/1994 | Noone et al. .......... | 138/121 |
| 5,413,147 A | * | 5/1995 | Moreiras et al. ...... | 138/109 |
| 5,622,210 A | * | 4/1997 | Crisman et al. ....... | 138/104 |
| 5,799,989 A | | 9/1998 | Albino | |
| 5,960,977 A | * | 10/1999 | Ostrander et al. ..... | 220/86.1 |
| 6,079,749 A | | 6/2000 | Albino et al. | |
| 6,276,728 B1 | | 8/2001 | Treichel | |
| 6,315,003 B1 | | 11/2001 | Albino | |
| 6,321,794 B1 | * | 11/2001 | Ishida et al. .......... | 138/121 |
| 6,428,052 B1 | | 8/2002 | Albino et al. | |
| 6,532,993 B1 | | 3/2003 | Albino | |
| 6,584,959 B1 | * | 7/2003 | Stieler .................. | 123/468 |
| 6,682,796 B1 | * | 1/2004 | Ito et al. ............... | 428/36.91 |
| 6,695,353 B1 | | 2/2004 | Treichel | |
| 2002/0117226 A1 | * | 8/2002 | Malcarne, Jr. ........ | 138/121 |
| 2002/0185188 A1 | * | 12/2002 | Quigley et al. ....... | 138/137 |
| 2003/0099799 A1 | * | 5/2003 | Koike et al. .......... | 428/36.91 |

FOREIGN PATENT DOCUMENTS

| | | |
|---|---|---|
| DE | 31 40 804 A | 4/1983 |
| DE | 42 38 605 A | 3/1994 |
| DE | 44 05 409 C | 8/1995 |
| EP | WO 95/09999 A | 4/1995 |
| EP | 0 813 014 A | 12/1997 |
| GB | 1 505 888 A | 3/1978 |

OTHER PUBLICATIONS

International Search Report, PCT/US2004/010738, Sep. 22, 2004.

* cited by examiner

*Primary Examiner*—James Hook
(74) *Attorney, Agent, or Firm*—Canton Colburn LLP

(57) ABSTRACT

A tubing assembly including conductive corrugated tubing including convolutions of peaks and valleys and a conductive polymer jacket disposed in said valleys along a length of said corrugated tubing.

11 Claims, 1 Drawing Sheet

CONDUCTIVE JACKET FOR TUBING

CROSS REFERENCE TO RELATED APPLICATIONS

This application claims the benefit of U.S. provisional patent application Ser. No. 60/461,085, filed Apr. 8, 2003, then entire contents of which are incorporated herein by reference.

BACKGROUND OF THE INVENTION

Corrugated tubing or metal hose provides an alternative to rigid piping systems as a conduit for transporting fluids such as natural gas. The corrugated tubing can be easily installed and is useful in many system applications. Corrugated tubing allows for simpler more cost-effective installation due to its uniquely flexible structure and relatively high strength. The same flexibility has inherent limitations. As the internal pressure of the working fluid inside the tubing is increased the corrugated tubing structure reacts to the pressure. The typical corrugated tubing structure begins to spread and expand along its length when the internal pressure overcomes the strength of the tubing material. The higher pressures of the working fluid cause the corrugations to expand. The corrugation expansion results in a distortion of the tubing out of its original shape and size.

In order to meet higher operating pressure ranges, conventional corrugated tubing may be sleeved with a wire braid. The braid is fixed at opposite ends of the corrugated tubing. The braid reinforces the corrugated tube structure thereby resisting the expansion of the corrugations when the internal pressure is increased. The braid is effective in the function of resisting the expansion of the corrugated tubing thereby increasing operational pressure capability. However, the braid covering the corrugated tubing outer diameter is subject to relative motion with the corrugated tubing that it covers. The tubing and the braid move relative to each other along the length of the corrugated tubing. In applications that plumb the corrugated tubing to mechanical equipment that create vibration translated to the tubing, the relative motion causes abrasion between the inside of the braid and the outer surface of the tubing. The abrasion between the tubing outer surface and the braid inner surface creates failure mechanisms that compromise the integrity of the corrugated tubing structure. The braid saws and rubs off the outer surface material of the corrugated tubing until the tubing pressure boundary fails and subsequently leaks the working fluid.

Another drawback to existing tubing is that the tubing is often contained within a jacket. Typically, the jacket is made from an insulative material. In the event that the piping is introduced to an electrical charge (e.g., from direct or indirect lightning), charge accumulates on the jacket and can burn through the jacket to the tubing resulting in a breach of the tubing.

SUMMARY OF THE INVENTION

An embodiment of the invention is a tubing assembly including conductive corrugated tubing including convolutions of peaks and valleys and a conductive polymer jacket disposed along a length of the corrugated tubing.

Another embodiment of the invention is a tubing assembly including a conductive corrugated tubing including convolutions of peaks and valleys and a conductive thermoplastic polymer jacket disposed along a length of the corrugated tubing. The thermoplastic polymer has a minimum tensile strength of about 4000 psi, a minimum elongation of about 300%, a minimum flexural modulus of about 25,000 psi and a maximum volume resistivity of about $7 \times 10^4$ ohm-cm. A fitting is coupled to the corrugated tubing at an end thereof.

DETAILED DESCRIPTION OF THE PREFERRED EMBODIMENTS

Figure 1:
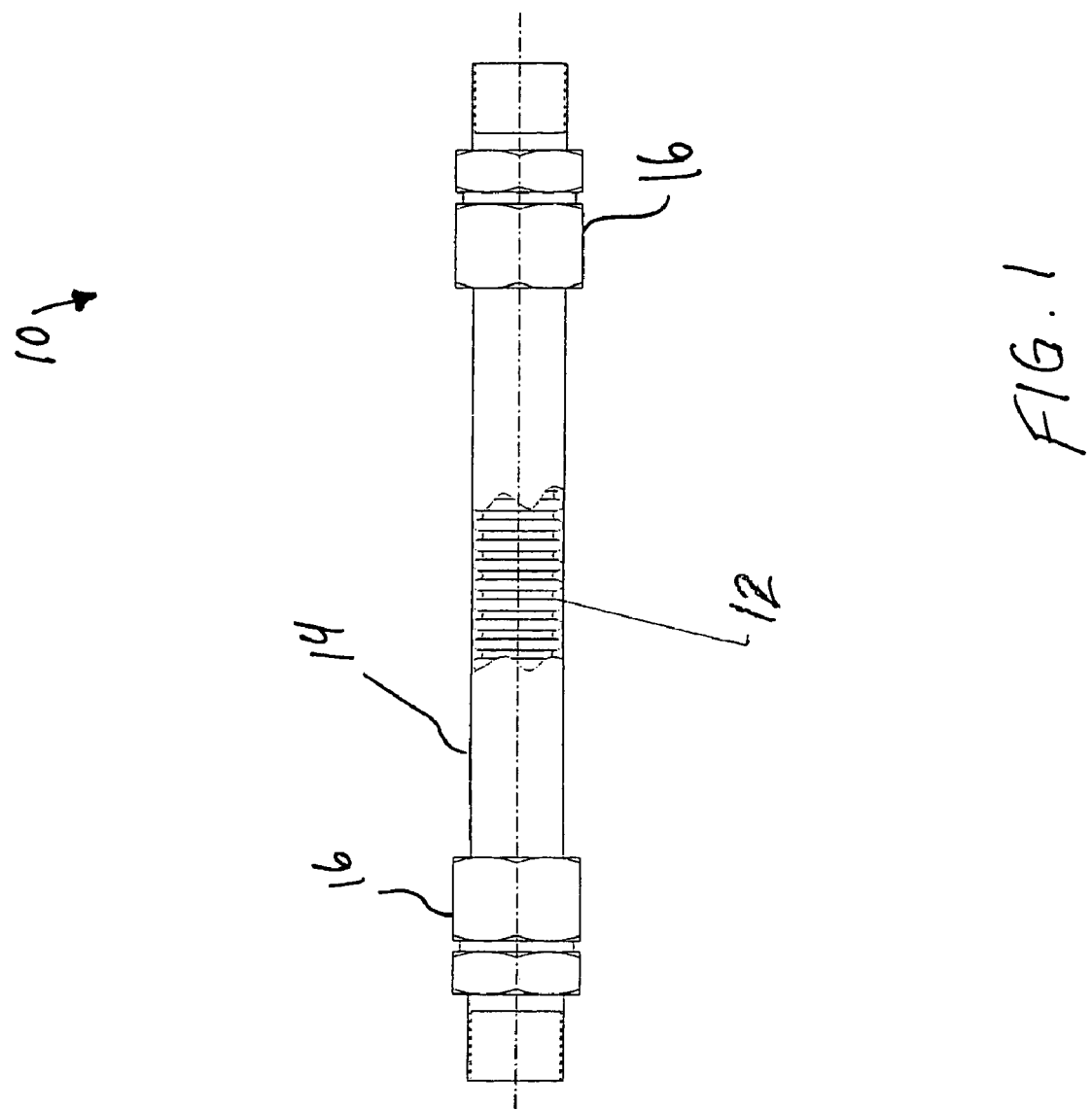
FIG. 1 is a side view, in partial cross-section, of a charge dissipating tubing assembly.

FIG. 1 is a side view, in partial cross-section, of a charge dissipating tubing assembly 10. The tubing assembly 10 includes tubing 12 and a conductive jacket 14. The tubing 12 may be annular, corrugated stainless steel tubing (CSST) for transporting fluids such as natural gas, liquids, etc. Alternatively, the tubing 12 may be helically wound tubing.

The jacket 14 is extruded over the tubing 12. The corrugated tubing 12 has an exterior surface and an interior surface. The interior surface is typically exposed to the working fluid. The corrugated tubing 12 comprises a structure that has varying diameters or convolutions that form peaks and valleys in alternating series along the length of the corrugated tubing 12. The exterior surface is used as the reference for the peak and valley as opposed to the interior surface. The peak consists of the convolution with the larger outside diameter and the valley consists of the convolution with the smaller outside diameter.

Conductive jacket 14 is disposed on the exterior surface of the corrugated tubing 12. The conductive jacket 14 may substantially fill the valleys and covers the peaks on the exterior surface. The conductive jacket 14 is disposed along the length of the corrugated tubing 12. The material makeup of the conductive jacket 14 has properties that resist forces that distort the material such as tension and shear forces. As a result, when the internal pressure of a working fluid increases and acts to spread apart the corrugated tubing 12 the conductive jacket 14 disposed in the valleys of exterior surface resists the forces that are created. The conductive jacket 14 inhibits the expansion or spreading of the corrugated tubing 12 such that the corrugated tubing 12 does not significantly distort either in the linear dimension or the diameter of the corrugated tubing 12. The conductive jacket 14 supports each convolution of the corrugated tubing 12. The material makeup of the conductive jacket 14 is also resilient and flexible. As the corrugated tubing 12 is bent and flexed along its length, the conductive jacket 14 bends and flexes with the corrugated tubing 12.

The thickness of the conductive jacket 14 can be varied to enhance resistance to tube expansion or to provide more or less flexibility to the corrugated tubing 12. A variety of pressure ratings can be met by changing the thickness of the conductive jacket 14. A direct relationship exists between the thickness of the conductive jacket 14 and the pressure rating of the corrugated tubing 12. Applying a conductive jacket 14 to the corrugated tubing 12 increases the pressure rating of the corrugated tubing 12 above the pressure rating of the corrugated tubing 12 without a conductive jacket 14. The conductive jacket 14 also increases the number of flex cycles required to create metal fatigue failure in the corrugated tubing 12 and attenuates vibration to reduce failure of corrugated tubing 12 due to vibration fatigue.

The conductive jacket 14 can be extruded into the corrugations of corrugated tubing 12. The use of other manufacturing processes can be employed to dispose the conductive jacket 14 onto the exterior surface of the corrugated tubing 12. In one embodiment, the conductive jacket 14 is driven into the valleys to substantially fill valleys and covers peaks. As the conductive jacket 14 is extruded it is substantially molten and flows down into the corrugations of the corrugated tubing 12. The molten conductive jacket 14 cools on the corrugated tubing 12. The molten material substantially fills the valleys and covers the peaks. In an alternate embodiment, a polymer conductive jacket 14 is extruded down into the corrugations and then cured (e.g., through heat).

The conductive jacket 14 may be applied so that the conductive jacket 14 bonds to substantially the entire exterior surface of the corrugated tubing. The optional bonding of the conductive jacket 14 to the exterior surface can be mechanical bonding or chemical bonding such that conductive jacket 14 substantially adheres to the exterior surface of the corrugated tubing 12. Also, by being located in the valleys, the conductive jacket 14 mechanically blocks the deformation of the corrugated tubing 12 as a result of the material properties of the conductive jacket 14. With the conductive jacket 14 applied such that there is an adhesion between the conductive jacket 14 and the surface of the corrugated tubing 12, there is no relative motion between the conductive jacket 14 and the surface of the corrugated tubing 12. Having eliminated the relative motion between the conductive jacket 14 and the exterior surface, the abrasive wear mechanism is substantially eliminated while still providing pressure reinforcement.

In an alternate embodiment, the conductive jacket 14 is extruded over the corrugated tubing 12, but not driven into the valleys of the corrugated tubing. The conductive jacket 14 covers the peaks of the corrugated tubing 12 but is not driven into the valleys.

Conductive jacket 14 may be made from a conductive, thermoplastic polymer such as a thermoplastic polyether-based polyurethane compound. Other conductive thermoplastics may be used for jacket 14, and the invention is not limited to polyurethane. The polymer preferably has the following properties.

TABLE A

| Property | Method | Value |
| --- | --- | --- |
| Tensile Strength | ASTM D638 | about 4000 psi Minimum |
| Elongation | ASTM D638 | about 300% Minimum |
| Flexural Modulus | ASTM D790 | about 25,000 psi Minimum |
| Volume Resistivity | ASTM D257 | about $7 \times 10^4$ ohm-cm Maximum |

In an alternate embodiment, the conductive jacket is made from a thermoplastic, polyethylene having characteristics identified in Table A. The polyethylene jacket may bond to the corrugated tubing 12 as described above.

At one or both ends of the tubing assembly are fittings 16. The fittings 16 may be existing CSST fittings such as those disclosed in U.S. Pat. Nos. 5,799,989, 6,079,749, 6,276,728, the entire contents of these patents being incorporated herein by reference. Preferably the end fittings are made from metals (e.g., brass).

Since the jacket 14 is made from a conductive thermoplastic, charge accumulated on jacket 14 (e.g., due to direct or indirect lightning strike) is conducted through the jacket 14 to the tubing 12 and then to the end fittings 16 and through components connected to fittings 16. Thus, the tubing 12 is not damaged by a build up of charge on a non-conductive jacket.

The tubing assembly may be used in a number of applications including residential or commercial, interior or exterior, and aboveground or underground installations where there is a likelihood for lightning strikes (direct or indirect) or other causes of electrical charge accumulation.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A tubing assembly consisting of:
   conductive, metal corrugated tubing including convolutions of peaks and valleys;
   a conductive polymer jacket disposed along a length of said corrugated tubing, said conductive polymer jacket forming a conductive path from the jacket to the corrugated tubing, said thermoplastic polymer has a minimum tensile strengh of about 4000 psi, a minimum enlogation of about 300% a minimum flexural modulus of about 25,000 psi and a maximum volume resistivity of about $7 \times 10^4$ ohm-cm.

2. The tubing assembly of claim 1 wherein:
   said corrugated tubing is annular.

3. The tubing assembly of claim 1 wherein:
   said corrugated tubing is helical.

4. The tubing assembly of claim 1 wherein:
   said polymer jacket is a thermoplastic polymer.

5. The tubing assembly of claim 4 wherein:
   said thermoplastic polymer is a polyether-based polyurethane.

6. The tubing assembly of claim 4 wherein:
   said thermoplastic polymer is a polyethylene.

7. The tubing assembly of claim 1 wherein:
   wherein said conductive polymer jacket substantially fills said valleys and substantially covers said peaks.

8. The tubing assembly of claim 1 further comprising:
   a metal fitting coupled to said corrugated tubing at an end thereof to form a conductive path between said metal fitting, said corrugated tubing and said conductive jacket.

9. The tubing assembly of claim 1 wherein;
   the conductive polymer jacket has a volume resistively sufficient conduct charge from direct or indirect lightning strikes through the conductive polymer jacket to the conductive, metal corrugated tubing.

10. A tubing assembly comprising:
    conductive, metal corrugated tubing including convolutions of peeks and valleys;
    a conductive thermoplastic polymer jacket disposed along a length of said corrugated tubing, said conductive polymer jacket forming a conductive path from said jacket to the corrugated tubing, said thermoplastic polymer has a minimum tensile strength of about 4000 psi, a minimum elongation of about 300%, a minimum flexural modulus of about 25,000 psi and a maximum volume resistivity of about $7 \times 10^4$ ohm-cm; and
    a metal fitting coupled to said corrugated tubing at an end thereof to form a conductive path between said metal fitting, said corrugated tubing and said conductive jacket.

11. The tubing assembly of claim 10 wherein:
    the conductive polymer jacket has a volume resistively sufficient conduct charge from direct or indirect lightning strikes through the conductive polymer jacket to the conductive, metal corrugated tubing.

* * * * *